C. L. SCHLADINSKA.
CONVEYER.
APPLICATION FILED JULY 16, 1920.

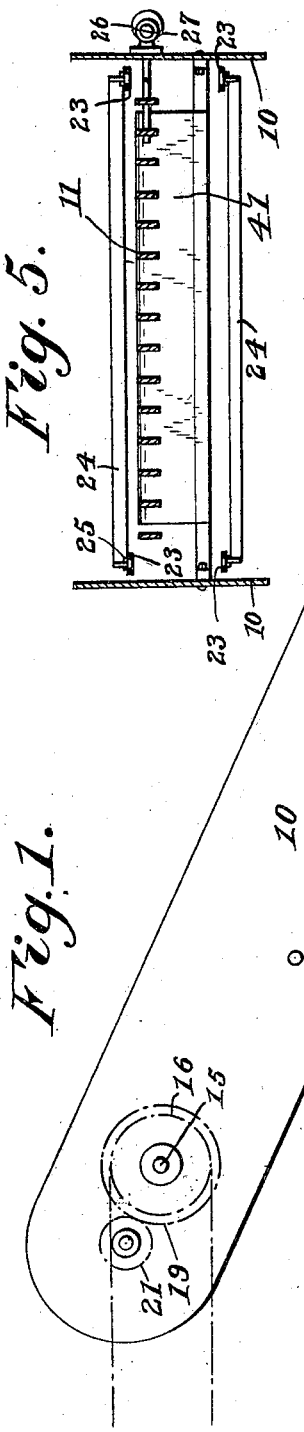
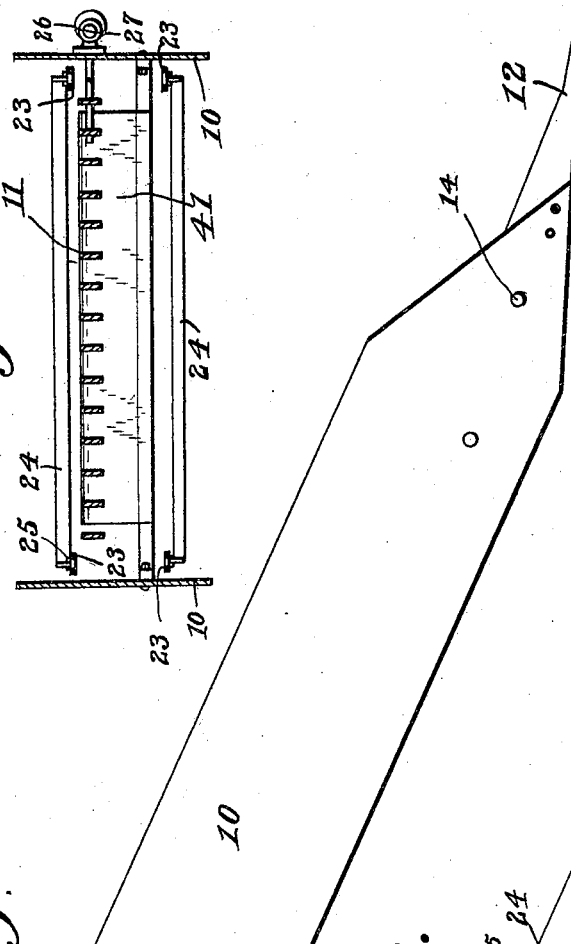
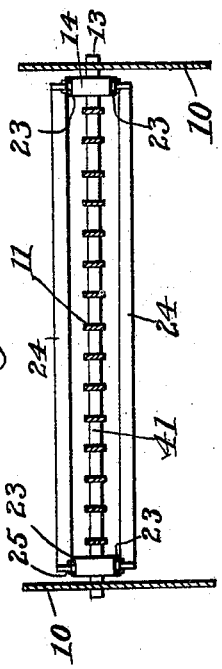
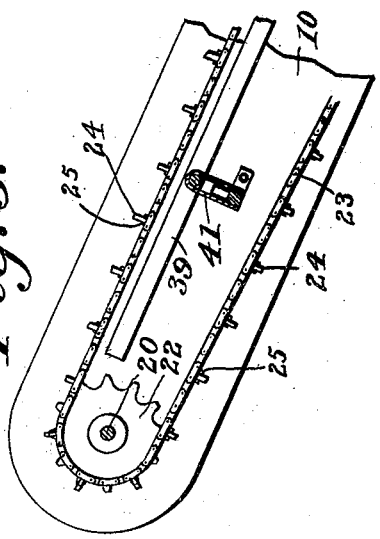

1,395,739.

Patented Nov. 1, 1921.
2 SHEETS—SHEET 2.

Fig. 2.

Inventor
Charles L. Schladinska
By
Attorneys

UNITED STATES PATENT OFFICE.

CHARLES L. SCHLADINSKA, OF FOUNTAIN CITY, WISCONSIN.

CONVEYER.

1,395,739.　　　　　　　　Specification of Letters Patent.　　　Patented Nov. 1, 1921.

Application filed July 16, 1920. Serial No. 396,869.

*To all whom it may concern:*

Be it known that I, CHARLES SCHLADINSKA, a citizen of the United States, residing at Fountain City, in the county of Buffalo, State of Wisconsin, have invented certain new and useful Improvements in Conveyers; and I do hereby declare the following to be a full, clear, and exact description of the invention, such as will enable others skilled in the art to which it appertains to make and use the same.

This invention relates to new and useful improvements in conveyers and particularly to conveyers for machines for digging potatoes or like root vegetables.

One object of the invention is to provide a novel and improved form of conveyer which combines therewith a shaking screen.

Another object is to provide a novel and improved shaking screen with novel means for driving the same.

Another object is to provide a novel and improved mechanism whereby the endless belt or apron is moved and the screen shaken transversely of the belt.

Other objects and advantages will be apparent from the following description when taken in connection with the accompanying drawing.

Figure 1 is a side elevation of a conveyer made in accordance with the invention.

Fig. 2 is a top plan view of the same.

Fig. 3 is a vertical longitudinal central sectional view on the line 3—3 of Fig. 2.

Fig. 4 is a vertical transverse sectional view on the line 4—4 of Fig. 2, looking in the direction of the scoop end of the conveyer.

Fig. 5 is a vertical transverse sectional view on the same line as that of Fig. 4, but looking in the opposite direction to the said figure.

Referring particularly to the accompanying drawings, there is shown a frame consisting of the longitudinal side members 10 connected adjacent their ends by the transverse members 11. Connected to the side members, at one end of the frame, is a digging scoop 12. Journaled transversely in the forward or lower ends of the side members 10 is a shaft 13, carrying on its end portions, inwardly of the members 10, the rollers 14. Journaled transversely through the other ends of the members 10 is a main drive shaft 15, having on its ends, outwardly of the members, the sprocket wheels 16, for receiving power from the axle 17 of the digging machine 18. On the shaft 15, inwardly of the sprocket wheels, are the gears 19. Journaled in the upper ends of the members 10, inwardly of the shaft 15, is a shaft 20, and carried by the ends of the shaft are the gears 21, which mesh with the gears 19, and are smaller in diameter than said gears 19. On the shaft 20, inwardly of the side members 10, are sprocket wheels 22, on which are engaged sprocket chains 23, said chains also engaging around the before-mentioned rollers 14. Extending transversely of the frame and connected at their ends to the chains 23, are the conveyer slats 24, the ends of the slats having the metal clips 25, secured thereto and secured to the chains, whereby the slats are arranged to travel around with the chains.

Mounted on one of the side members 10, adjacent the lower end thereof, is a journal bracket 26 which rotatably supports the adjacent end of the longitudinal shaft 27. The other end of the shaft 27 is rotatably supported in a journal bracket 28, mounted on the same side of the frame. This latter bracket 28, however, has a second bearing 28', extending at right angles to the portion which supports the shaft 27, in which is rotatably supported a short shaft 29. On the outer end of this shaft 29 there is secured a sprocket wheel 30, engaged by the drive chains 31, which also engages around the adjacent sprocket wheel 16. The shaft 29 has a bevel gear on its inner end which is shown at 32, and said gear meshes with a similar gear 33 on the adjacent end of the shaft 27.

Formed on the end portions of the shaft 27, inwardly of the brackets 26 and 28, are the cranks 34 and 35, and connected to these cranks are the short pitmen rods 36 and 37. The inner end of the pitman 36 is pivotally connected to an L-shaped bolt 38 secured to the adjacent longitudinal parallel slats 39 of the shaking screen frame. The other pitman 37 is pivotally connected to a U-shaped bolt 40, also secured to said slats, but at the other end thereof.

These slats 39 extend longitudinally between the chains 23, and between the upper and lower laps thereof, said slats being secured adjacent their ends to the transverse U-shaped bars 41. These bars 41 are mounted for slidable movement on the transverse bars 11, the combination of the slats and bars 41 being reciprocated, from one side of the main frame to the other, by the pitmen rods 36 and 37, as the shaft 27 is rotated, and the machine proceeds forwardly. Within each bar 41 is secured a longitudinal rod 42, and disposed between the rod 42 and the rod 11, with its pintle ends journaled in the side wings of the bar 41, are the rollers 43, whereby the easy and smooth movement of the shaking screen is accomplished.

What is claimed is:

A shaking screen including a frame, transverse bars connecting the sides of the frame, an inverted channel member on each of the bars for longitudinal slidable movement with respect thereto, the bight of each inverted channel member being formed with a plurality of transverse notches, a longitudinal shaft supported on one side of the frame and having crank portions, screening bars disposed in the said notches and extending longitudinally within the frame, and pitmen connected to certain of the outermost of the screening bars and operatively connected with the crank portions of the longitudinal shaft.

In testimony whereof, I affix my signature, in the presence of two witnesses.

CHARLES L. SCHLADINSKA.

Witnesses:
 VALENTINE THOENY,
 AND. BAERTSCH.